United States Patent Office 3,408,659
Patented Nov. 5, 1968

3,408,659
ARTIFICIAL BLOOD VESSELS AND PROCESS OF MAKING SAME
Heinrich Thiele, Kiel, and Arnold Wiechen, Kronshagen near Kiel, Germany, assignors to Heinrich Thiele, Kiel, Germany
No Drawing. Filed July 21, 1965, Ser. No. 473,819
Claims priority, application Germany, July 25, 1964, T 26,670
17 Claims. (Cl. 3—1)

The present invention relates to artificial blood vessels, tracheae, and the like tubular parts of the human and animal body and particularly to artificial aortas, arteries and other blood vessels, tracheae, and the like tubular parts of the body which are useful in surgery and which are similar in their composition and structure to the natural blood vessels and the like, to a process of producing such artificial blood vessels and the like tubular parts of the human body, and to a process of using them, for instance, in surgery.

It is known in modern surgery to replace diseased blood vessels, tracheae, and other tubular parts of the human and animal body by artificial tubes and the like molded bodies and especially to replace blood vessels by artificial blood vessels. Such artificial tubular parts of the human and animal body and especially artificial blood vessels are made of synthetic materials such as polyamides or silicones. However, such artificial blood vessels and the like are foreign to and are frequently not accepted by and built into the human and animal body or they are decomposed or degraded and thus eliminated therefrom. Therefore, their use in surgery causes often post-operative complications and irreparable damage.

It is one object of the present invention to provide new and valuable artificial blood vessels, tracheae, and other tubular parts of the human and animal body which correspond in their composition and structure to natural blood vessels and the like and which are well tolerated and readily accepted by the human and animal body.

Another object of the present invention is to provide a simple and highly effective process for preparing such artificial blood vessels, tracheae, and other tubular parts of the human and animal body.

Still another object of the present invention is to use such new and valuable artificial tubular bodies in surgery as replacement for diseased blood vessels, tracheae, and other tubular parts of the body.

These and other objects of the present invention and advantageous features thereof will become apparent as the description proceeds.

In principle, the artificial tubular bodies according to the present invention are composed of natural tissue material and thus are readily accepted by and built into the human or animal body. Such tubular bodies, aortas, arteries, and other blood vessels, tracheae, and other tubular parts of the human and animal body are produced by using, as starting material, the natural tubular bodies, blood vessels, tracheae, and the like, exposing such starting materials to agents which cause them to swell, meachanically separating the swollen material into separate layers corresponding to the histological specific structure of the natural material, and dissolving these layers—each by itself—in suitable solvents which do not cause any substantial denaturation of the proteins. Thereby, clear, viscous solutions or sols exhibiting double refraction are obtained.

The desired artificial tubular bodies are reconstructed from such solutions by converting said sols into gels and precipitating the gels on a suitable mold. Preferably gel formation is effected by allowing gel-forming ions to diffuse through the porous mold immersed into the respective sol and thus to precipitate the gel on the mold surface.

When withdrawing the mold immersed, for instance, into the intima sol of a blood vessel after precipitation thereon of the intima gel, immersing the mold and said gel into the media sol, and allowing the gel-forming ions to diffuse through the porous mold and the intima gel, a media gel is formed upon the intima gel. Likewise, immersion of the mold with the superposed intima and media gels into the externa sol and allowing gel-producing ions to diffuse through the porous mold and the superposed intima and media gels, the externa sol is converted into an externa gel superposed on said intima and media gels. Thus an artificial blood vessel consisting of three layers and thus being very similar to the natural blood vessel is produced.

The sols according to the present invention are obtained, for instance, by dissolving the natural starting material in acids, preferably in relatively weak organic acids, such as pyruvic acid, lactic acid, tartaric acid, or citric acid, or in alkaline solutions such as solutions of urea or urea derivatives. Salt solutions such as lithium thiocyanate may also be used. To precipitate the gel, ions of an electric charge opposite to that of the solubilizing agent are allowed to diffuse into said sols. The gel can also be precipitated by electrophoresis or by simply changing the pH values.

Of course, care must be taken to use only such sol- and gel-forming agents which do not cause degradation or denaturation of the protein. Whether such degradation or denaturation has taken place, can readily be determined by measuring the optical rotation of the sols and the refraction index of the gels.

As has been found, the original natural protein is present in the sols in the form of filamentous molecules. Due to the preservation of the original structure of the protein, the sols are of high viscosity, are readily spinnable, and show double refraction. They can be stored for a prolonged period of time when sterilized and refrigerated.

The resulting gels are colorless and transparent and, due to the diffusion of ions of opposite charge, consist of filamentous molecules which are arranged in the same manner as in the original natural starting material. Therefore, the gels show double refraction.

When producing artificial tubular bodies from natural starting materials according to the present invention, it is a preferred procedure to first defatten the blood vessels and other tubular bodies as soon as possible after slaughtering of the animals by a treatment with a defattening agent such as methanol, ethanol, acetone, or mixtures thereof with minor amounts of dimethoxymethane. Thereafter, the defattened blood vessels and the like are treated with solvents which do not affect, destroy, or denature the proteins, but are capable of dissolving the mucopolysaccharides and uronic acids present in the starting material. This dissolution of the mucopolysaccharides and uronic acids is preferably effected with solvents which simultaneously cause swelling of the starting material. The swollen blood vessels and the like are then mechanically separated into the three layers of which they usually consist, i.e. the intima, media, and externa. The coarsely comminuted separated layers are then dissolved, preferably in an alkaline medium. Dissolution of the proteins is advantageously carried out at a temperature not exceeding about 27° C. When operating at a higher temperature, the enzymes present in the starting material will cause degradation and decomposition of the starting tissue to an undesired extent while, at a lower temperature, the reaction and dissolution velocity is considerably retarded. Whether the solvents used and the reaction conditions cause undesired denaturation of the proteins, can readily be controlled by determining optical rotation and viscosity of the solutions. It is advisable to carry out all the operations under sterile conditions.

It is a preferred embodiment of the present invention to dissolve the three layers forming the natural blood vessels not at their isoelectric points and separately in solvents as they are known and used for dissolving proteins such as solutions of urea and alkaline agents. Excess solvent is removed from the sols by dialysis. As stated above, the resulting viscous protein-containing solutions which show double refraction can be stored without decomposition at a low temperature for a prolonged period of time.

To reconstruct the tubular body, i.e. the blood vessel, trachea, and the like, the protein-containing solutions are mixed with the corresponding amount of mucopolysaccharides and uronic acids and the mixture is de-aerated by exposure to a vacuum or by centrifuging. Ions of opposite electric charge are then allowed to diffuse into the solution of the proteins, mucopolysaccharides, and uronic acids, if required, by simultaneously causing the solution to rotate and/or to flow. Due to the action of said cations the filamentous molecules are first arranged in proper order and are then solidified to a protein-containing gel with the natural elasticity and flexibility as well as the specific fine structure of the original material. Especially suitable multivalent metal cations are, for instance, calcium, copper, cadmium, aluminum, and lanthanum cations. Hydrogen ions are also suitable.

The resulting elastic coherent, water-containing gels of tubular shape are then placed into natural blood serum whereby they absorb the organic and inorganic components present in the starting material. Thus, for the first time, there have been provided to the medical profession artificial arteries, and other blood vessels, tracheae and other tubular parts of the human and animal body which possess all the desired properties of the natural materials and are of considerable mechanical stability and strength, of high flexibility and elasticity and are well tolerated and readily accepted by the human and animal body.

The follwing example serves to illustrate the present invention without, however, limiting the same thereto.

EXAMPLE

A. Preparation of the solutions

Natural blood vessels, for instance, aortas, are removed from calves, pigs, or other animals shortly after slaughtering and are defattened by a treatment with a mixture of methanol and dimethoxymethane (4:1) for a period of time not exceeding two hours.

The defattened blood vessels are placed into an aqueous 1% sodium hydroxide solution for 100 hours. The solution is removed from the swollen blood vessels by centrifuging and contains the mucopolysaccharides and uronic acids. These compounds are precipitated from their solution by passing carbon dioxide therethrough. The precipitate, however, is not dried but stored in the moist state under refrigeration so as to avoid degradation of the mucopolysaccharides and uronic acids.

The swollen blood vessels are then mechanically separated into three layers. The resulting small pieces of separated intima, media, and externa are collected and placed separately into an aqueous 50% urea solution. By subjecting the mixture to the action of a homogenizer clear viscous solutions of the intima, media, and externa of the aorta are obtained. These three solutions can be stored for several months under sterile conditions in the refrigerator.

B. Reconstruction of the aorta

An amount of mucopolysaccharides and polyuronides corresponding to the amount of those compounds present in the natural starting material, is added to the three solutions containing the three blood vessel layers. Said three solutions are then deaerated, if necessary, by means of a centrifuge or by subjecting them to a vacuum.

A porous, tubular mold of a diameter corresponding to the inner diameter of the aorta is immersed into the solution containing the intima dissolved therein. An aqueous N cupric nitrate solution is introduced into the interior of the tubular mold. The cupric ions diffuse through the porous walls of the tubular mold into the solution and cause precipitation of a gel membrane on the surface of the mold. As soon as the intima gel membrane has attained the required thickness, the tubular mold together with the intima membrane adhering thereto is removed from the solution and immersed into the solution containing the dissolved media layer of the aorta. A media gel layer is allowed to grow on top of the intima layer by allowing cupric ions to diffuse through the porous walls of the mold whereby diffusion is facilitated, if necessary, by rotating the mold and/or by passing a stream of the solution around the mold. After a media layer of the required thickness has been precipitated and grown upon the first intima layer, the tubular mold with the two layers adhering therethrough is immersed into the third solution containing dissolved therein the externa layer of the original aorta. A third layer composed of the externa part of the aorta is precipitated and grown on top of the media and intima layers by diffusion of cupric ions until the externa layer has attained the desired thickness. The metal cations are then exchanged against hydrogen ions by treating the mold with the three superimposed layers with a dilute acetic acid solution. Excess hydrogen ions are removed from the layers by dialysis or electrodialysis. The mold with the three layers is then immersed in natural blood serum until the resulting tubular gel body has absorbed all the required components of the serum.

Instead of precipitating the gel by the action of ions having an electric charge opposite to that of the ions present in the solutions of the blood vessel material, precipitation can also be effected by electrophoresis by using the mold as a membrane in an electrodialyzer.

The process according to the present invention allows to produce artificial blood vessels, for instance, arteries, aortas, tracheae, and other tubular parts of the human and animal body by using natural starting materials. The resulting blood vessels and the like are readily accepted by the human and animal body and correspond in their histological structure to the natural blood vessels and the like. The artificial blood vessels, trachea, and other tubular parts of the human and animal body have proved of great value in surgery where they serve to replace diseased blood vessels and the like. In contrast to the known artificial blood vessels and the like, which are foreign to the human and animal body, they consist of tissue material of a composition similar to that of the starting material and thus are not rejected by the body.

Of course, many changes and variations in the components of the artificial tubular bodies, in the defattening agents, the solubilizing agents, the gel-forming agents used, in the conditions of dissolving the natural starting material and of forming tubular gels therefrom, in the methods of working up the resulting tubular bodies and of storing them, and the like may be made by those skilled in the art in accordance with the principles set forth herein and in the claims annexed hereto.

I claim:

1. A process of producing artificial tubular bodies for the replacement of natural tubular parts of the human and animal body, said process comprising the steps of
   (a) causing a natural tubular part of the human and animal body to swell,
   (b) mechanically separating said swollen tubular part into separate layers according to the specific histological structure of said natural starting material,
   (c) separately dissolving said layers in solvents without substantially affecting the protein components of said layers, and
(d) successively causing formation of superposed gels from said solutions to reconstruct the tubular part of the human and animal body from said solutions.

2. A process of producing artificial blood vessels comprising the steps of
(a) causing a blood vessel to swell,
(b) mechanically separating said swollen blood vessel into three layers of the intima, media, and externa parts thereof,
(c) separately dissolving said layers into solvents without substantially affecting the protein components of said layers,
(d) causing formation of a gel of the resulting intima solution on a tubular mold,
(e) causing formation of a gel of the resulting media solution superposed on said intima gel, and
(f) causing formation of a gel of the resulting externa solution on said superposed intima and media gels so as to reconstruct the blood vessel from said intima, media, and externa solutions.

3. A process of producing artificial tubular bodies for the replacement of natural tubular parts of the human and animal body, said process comprising the steps of
(a) treating a natural tubular part of the human and animal body with a swelling solvent for mucopolysaccharides and uronic acids,
(b) removing the swelling solvent from the swollen tubular part,
(c) mechanically separating said swollen tubular part into separate layers according to the specific histological structure of said natural starting material,
(d) separately dissolving said layers in solvents without substantially affecting the protein components of said layers,
(e) adding to said solutions the mucopolysaccharides and uronic acids recovered from said swelling solvent, and
(f) successively causing formation of superposed gels from said solutions to reconstruct the tubular part of the human and animal body from said solutions.

4. The process according to claim 1, wherein the swelling solvent used in step (a) is an aqueous acid solution not substantially affecting the protein components of said natural tubular part.

5. The process according to claim 1, wherein the swelling solvent used in step (a) is an aqueous alkaline solution not substantially affecting the protein components of said natural tubular part.

6. The process according to claim 1, wherein the natural tubular part of the human and animal body is defattened before causing it to swell.

7. The process according to claim 6, wherein defattening is effected with a mixture of methanol and formaldehyde in the proportion of about 4 parts of methanol to about 1 part of dimethoxymethane.

8. The process according to claim 1, wherein the solvent used in step (c) to dissolve the swollen layers of the starting material is selected from the group of solvents consisting of aqueous solutions of organic acids, urea, alkali metal thiocyanates, and alkali metal hydroxides.

9. The process according to claim 1, wherein gel formation according to step (d) is effected by a treatment with ions of an electric charge opposite to that of the ions causing dissolution of the swollen layers of the starting material.

10. The process according to claim 1, wherein gel formation according to step (d) is effected by causing ions of an electric charge opposite to that of the ions causing dissolution of the swollen layers of the starting material to diffuse through a porous tubular mold into the solution of the respective layer so as to precipitate the resulting gel on said tubular mold in the form of a coherent membrane.

11. The process according to claim 1, wherein gel formation according to step (d) is effected by electrophoresis on a membrane of tubular shape.

12. The process according to claim 1, wherein gel formation according to step (d) is effected by causing cations of polyvalent metals to diffuse through a porous tubular mold into the solution of the respective layer so as to precipitate the resulting gel on said tubular mold in the form of a coherent membrane, thereafter
(e) treating the tubular gel with an acidic solution to exchange the metal ions by hydrogen ions,
(f) removing excess hydrogen ions by dialysis, and
(g) immersing the resulting tubular gel in blood serum to cause absorption of the components of said serum by said gel.

13. A process of producing artificial blood vessels comprising the steps of
(a) defattening a blood vessel, the defattening agent not substantially affecting the protein components of said blood vessel,
(b) treating the defattened blood vessel with a swelling solvent for mucopolysaccharides and uronic acids, said swelling solvent not substantially affecting the protein components of said blood vessel,
(c) removing the swelling solvent from the swollen blood vessel,
(d) mechanically separating said swollen blood vessel into three layers of the intima, media, and externa parts thereof,
(e) separately dissolving said layers into solvents without substantially affecting the protein components of said layers,
(f) adding to said solutions the mucopolysaccharides and uronic acids recovered from said swelling solvent,
(g) causing formation of a gel of the resulting intima solution on a tubular mold,
(h) causing formation of a gel of the resulting media solution superposed on said intima gel,
(i) causing formation of a gel of the resulting externa solution on said superposed intima and media gels so as to reconstruct the blood vessel from said intima, media, and externa solutions, and
(j) immersing the resulting tubular gel in blood serum to cause absorption of the components of said serum by said gel.

14. An artificial tubular body suitable for the replacement of natural tubular parts of the human and animal body consisting of superposed layers of gels successively precipitated from solutions of the histologically defined layers of natural tubular parts of the human and animal body, said artificial tubular body corresponding in its specific structure to the histological structure of said natural tubular parts, said tubular body, when used in surgery to replace diseased natural tubular parts of the human and animal body, being readily accepted by the human and animal body and being of high mechanical stability, strength, and elasticity, said artificial tubular body containing the proteins of said natural tubular parts of the human and animal body in substantially unchanged, undegraded, and not denatured form, the filamentous protein molecules therein being arranged in substantially the same manner as in the natural tubular parts of the human and animal body, said artificial tubular body showing double refraction.

15. An artificial blood vessel suitable for the replacement of natural blood vessels consisting of superposed layers of gels successively precipitated from solutions of the intima, media, and externa parts of the natural blood vessel, said artificial blood vessel corresponding in its specific structure to the histological structure of the natural blood vessel, said artificial blood vessel, when used in surgery to replace diseased natural blood vessels, being readily accepted by the human and animal body and being of high mechanical stability, strength, and elasticity, said artificial blood vessel containing the proteins of said natural blood vessels in substantially unchanged, undegraded, and not denatured form, the filamentous protein molecules therein being arranged in substantially the same manner as in the natural blood vessels, said artificial blood vessel showing double refraction.

16. The artificial blood vessel according to claim 17 containing, in addition to the substantially unchanged proteins, the substantially unchanged mucopolysaccharides and uronic acids present in the natural blood vessels and the components of blood serum absorbed therefrom.

17. The process according to claim 1, wherein the process is carried out at a temperature of about 27° C.

References Cited

UNITED STATES PATENTS

| | | | |
|---|---|---|---|
| 2,127,903 | 8/1938 | Bowen | 128—334 |
| 2,900,644 | 8/1959 | Rosenberg et al. | 3—1 |
| 3,114,372 | 12/1963 | Griset et al. | 128—335.5 |
| 3,272,204 | 9/1966 | Artandi et al. | 128—334 |
| 3,316,557 | 5/1967 | Liebig. | |

DALTON L. TRULUCK, *Primary Examiner.*